United States Patent [19]
Buchelt

[11] 3,750,789
[45] Aug. 7, 1973

[54] CENTRIFUGAL HYDRAULIC OPERATED CLUTCH

[75] Inventor: Benno E. Buchelt, Klagenfurt, Austria

[73] Assignee: Avco Corporation, Stratford, Conn.

[22] Filed: Nov. 9, 1971

[21] Appl. No.: 197,099

[52] U.S. Cl............ 192/105 A, 92/107, 192/113 B
[51] Int. Cl.......................................... F16d 43/284
[58] Field of Search................ 192/85 F; 192/105 A

[56] References Cited
UNITED STATES PATENTS

| | | | |
|---|---|---|---|
| 3,554,341 | 1/1971 | Anderson | 192/105 A |
| 2,960,202 | 11/1960 | Stevens et al. | 192/85 F |
| 2,209,884 | 7/1940 | Halford | 192/105 A |
| 2,352,478 | 6/1944 | Halford | 192/105 A |
| 2,562,515 | 7/1951 | Wemp | 192/105 A |
| 3,485,328 | 12/1969 | Bilton | 192/105 A X |

FOREIGN PATENTS OR APPLICATIONS

| 970,411 | 9/1958 | Germany | 192/105 A |
|---|---|---|---|

Primary Examiner—Benjamin W. Wyche
Attorney—Charles M. Hogan and Irwin P. Garfinkle

[57] ABSTRACT

A hydraulic actuated disc clutch particularly suitable for helicopter use has a built in torque control function varying with time resulting in a scheduled slipping time satisfying start requirements. The structure makes use of centrifugal force generated oil pressure operating with an oil ring generated in a rotating cylinder so that the integrated force resulting from local oil pressure times the radial area increment of the oil ring fed during engagement time acts on an engagement piston for the clutch An oil ring width defining end wall accomplishes a time variation of filling time by speed up or delay in filling time and thus in formation of radial area of the oil ring. This results from a change in the shape of the end wall controlling the width of the oil ring; and hence, controlling the timing of the variation in clutch engaging force to a desired time programmed variation.

2 Claims, 3 Drawing Figures

PATENTED AUG 7 1973     3,750,789

INVENTOR.
BENNO E. BUCHELT
BY Charles M. Hogan
ATTORNEYS

CENTRIFUGAL HYDRAULIC OPERATED CLUTCH

BACKGROUND

Clutches generally have a primary purpose to afford a smooth start. This is particularly true of clutches for use with helicopters, for which the clutch herein disclosed is primarily designed, although not necessarily so limited.

The rotor blades of a helicopter are sensitive to bending stresses during start, until the increasing centrifugal force stabilizes them at higher speeds. The permissible bending stresses can be controlled by means of a programmed smooth nearly constant acceleration to overcome the inertia of the shaft system.

It is also important that there be a programmed increase in torque over a start-up slipping time in order to balance increasing aerodynamic drag against increasing stabilizing centrifugal force with control of torque variation effective early in the slipping time period of clutch actuation and under control over the entire time period of actuation. The torque should be such a function over the time, that the stress level is kept on its near maximum permissible value during the slipping time. To enable this, is an important feature of the invention disclosed herein.

SUMMARY

It is a primary object of the invention to provide a clutch with an engagement member actuated by centrifugal force generated oil pressure in a programmed variation in actuating torque force over the time period of clutch engagement and actuation, whereby the torque function over the time is such that the stress level of the helicopter rotor blade, for example, is kept on its near maximum permissible value during the slipping time.

It is a further object to provide a clutch wherein the clutch engaging member force is variable with time accomplished by timed variation in radial area increase of a radially extending rotating centrifugal force generating oil ring which produces an actuating force on the clutch engagement member during the time that oil is fed into an oil ring forming rotating cylinder.

It is another object to provide variation in time rate of change in radial area of a force generating oil ring by variation of axial width of the rotating oil ring relative to the radius of a rotating cylinder forming the ring, thus producing time variation in area increase during a substantially uniform flow rate of oil ring forming oil over a time period of clutch actuation.

It is a further object to provide a programmed rate of change of clutch actuation, by variation over the radius during filling of the axial width of a centrifugal force generating oil ring positioned to actuate a clutch engagement member, such variation accomplished by variation in shape of a wall of a rotatable oil retaining chamber forming the oil ring.

It is another object to provide a time programmed variation in engagement member force for a clutch wherein a centrifugal force generated oil pressure acts in a rotating oil ring on the engagement member, the force being variable with time during clutch engagement.

It is a further object to assure that centrifugal force generating oil pressure will be effective from the very beginning of clutch actuation to act on the clutch engagement piston by mounting both the centrifugal force producing cylinder and the clutch engagement piston to rotate from the main driving shaft and in contact with the incoming oil and the oil ring.

DRAWINGS

DESCRIPTION

Figures 1, 2:
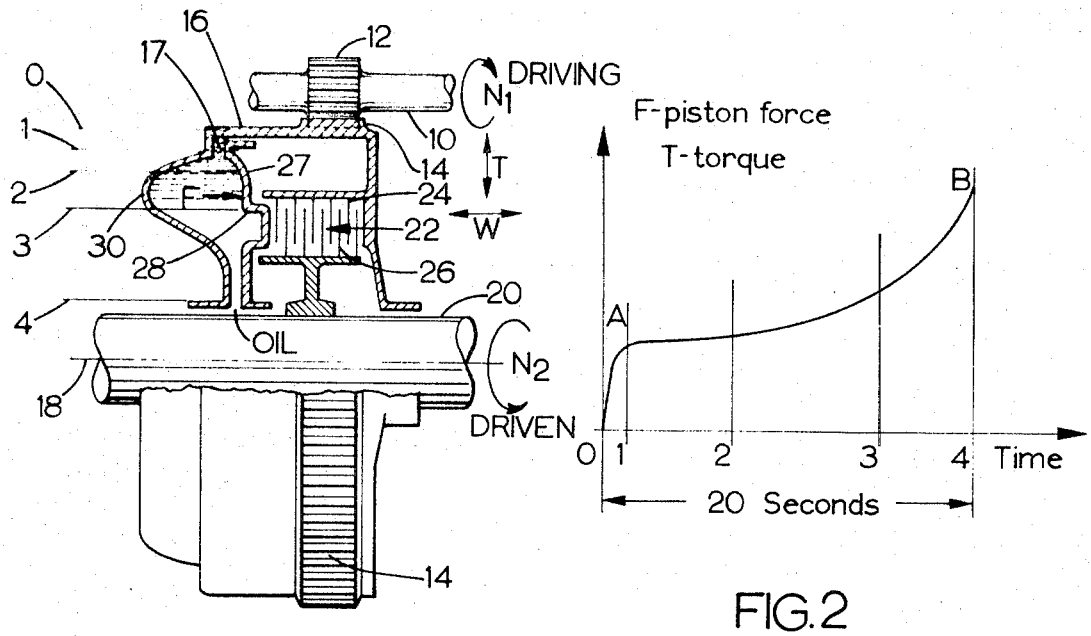
FIG. 1 is a section through the clutch and is in diagrammatic form to show certain essential protions of the clutch and their relation.
FIG. 2 is a graph showing variation in the clutch actuating force plotted against time of clutch actuation.

Referring to FIG. 1 of the drawings, there is a partially diagrammatic showing of the clutch assembly. Driving shaft 10 from the engine power source has a driving gear 12 which drives a gear 14 carried on a hydraulic cylinder 16 which is rotatable on its axis 18 which is also the axis of a driven shaft 20 which is the drive connection to a driven unit such as a helicopter rotor, not shown. A disc clutch assembly 22 carries driving discs 24 secured to rotate with the cylinder 16 and are alternately stacked with driven clutch discs 26 which are connected to rotate the driven shaft 20. An engagement piston 28 is mounted axially slidable in cylinder 16 on the driven shaft 20 and is so shaped as to contact the disc clutch assembly 22 at one end thereof, the piston 28 being enclosed in the hydraulic cylinder 16.

It is understood that the cylinder 16 forms an annular chamber coaxial with the driven shaft 20, and the clutch assembly 22 with its clutch discs 24, 26, are all annularly formed to rotate around the common axis of the driven shaft 20. Provision is made to supply hydraulic fluid (operating oil) to flow during rotation into the cylinder 16 from central regions of the assembly shown more in detail in FIG. 3.

Figure 3:
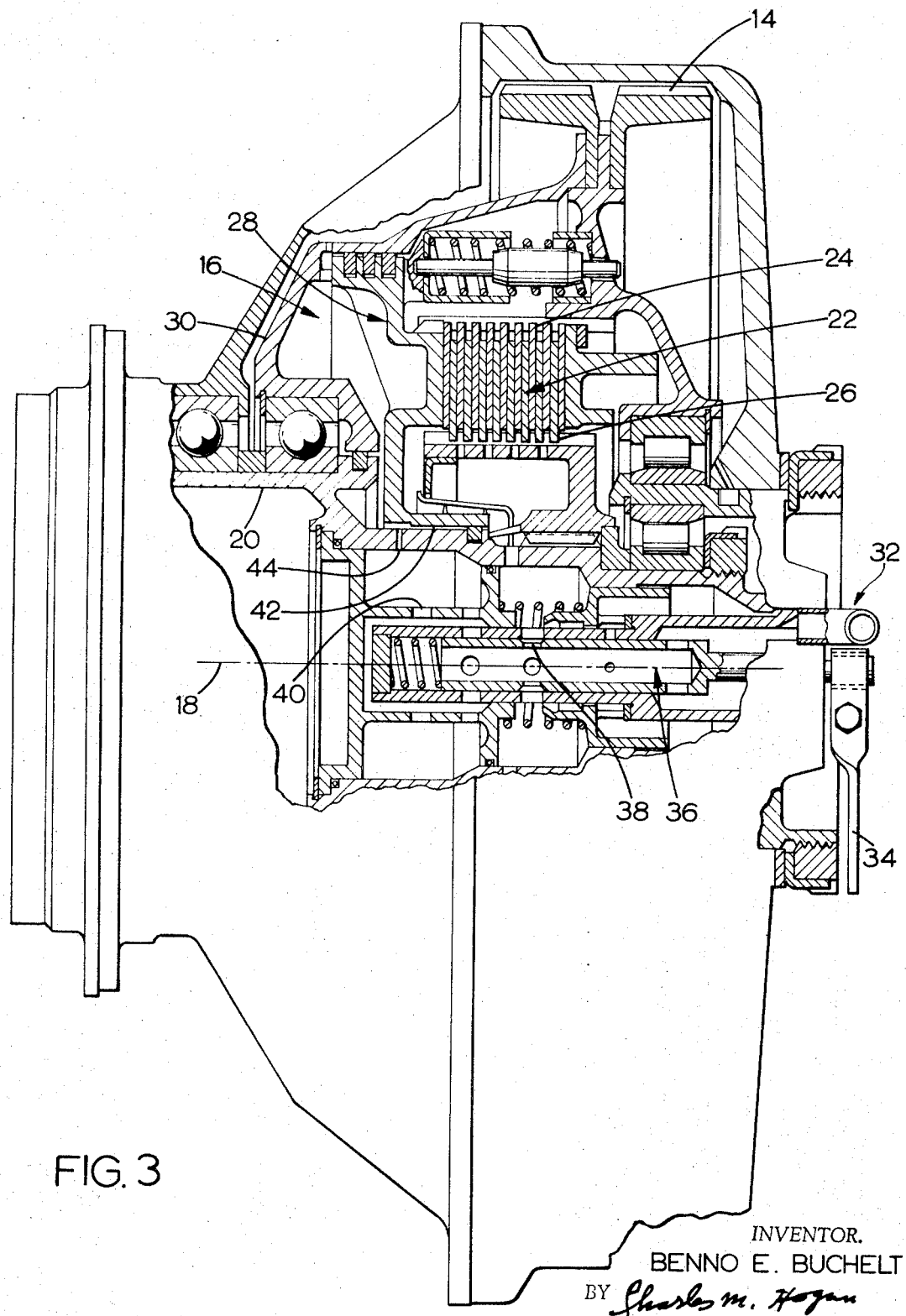
FIG. 3 is a more detailed showing of the clutch in cross section, and it includes parts shown in FIG. 1.

Passage ways 44 of flow limiting size extend from the central region of the clutch assembly to the cylinder 16, the passage ways being shown in FIG. 3. The structure affords a controlled flow of operating oil at a substantially constant rate into the cylindrical chamber 16 during the time period of clutch actuation. This actuation time period is started by the manual operation of the lever 34 which actuates valve 36 to start fluid flow outward through the flow limiting passage ways 44 which continues over the time period of clutch actuation. Thus, oil from the central portion of the assembly will on rotation of the hydraulic cylinder 16 be thrown by centrifugal force, on rotation of the cylinder 16, to the outside of the cylinder 16, where it forms an annular ring (see section through oil ring formed at 17 when cylinder is filled 0 to 1 in FIG. 1). Also, as a result of such rotation, a centrifugal force generated oil pressure will result in the rotating oil ring carried with the cylinder 16. There is, thus, formed a thickness, a radial thickness, of oil in which will be generated the piston force on the engagement piston 28, which forms a wall 27 of the oil containing chamber and is mounted axially slidable within the cylinder 16. This generated oil pressure from centrifugal force of rotation will cause the piston 28 to be urged in a direction toward the right as shown in FIG. 1 and to contact the clutch disc assembly 22 to exert engagement pressure on the clutch disc assembly to compact the clutch discs to connect the driving shaft 10 with the driven shaft 20 in a timed interval of compacting actuation to assure a satisfactory start in rotation of such an element as a helicopter rotor.

The piston 28 force, which results from the rotation and the generated oil pressure of the rotating cylinder 16, is a product of this generated centrifugal force in the oil, times the radial area of the oil ring, at any given actuation time, acting on the engagement piston 28 to force it in a direction to actuate the clutch. For each position of radial thickness (such as 0 to 1) in the formation of the oil ring, by inflow of oil from the central portion of the assembly, and for any given rate of rotation of the cylinder 16, the so-called radial thickness of the rotating oil ring will generate a constant force on the clutch 22 through the engagement piston 28. In other words, the piston force is variable with time at a given rate of rotation if it is assumed that oil is being fed into rotating cylinder over a time period of actuation. The piston force F at a given rate of rotation equals the centrifugal force generated oil pressure at each radius of filling, times the radial area of the oil ring at that radius, rotation rate, and time, such force acting in an axial direction on the axially movable clutch engagement piston 28. If the cylinder were of a constant axial width, there would be an increase in force with time which would be in relation to the increase in radial area (normal to cylinder axis) of the rotating oil ring as the cylinder is filled with oil. However, as it is desired to provide a variation in time of reaching given forces during filling (over the actuation time program) it is a concept of this invention to change the width (in axial direction W) of the oil ring, as shown in FIG. 1. This is accomplished in the illustrative structure by the form of the end wall 30 of the cylinder which is made in a variable shape over the radius; that is, the increase in axial width of the oil ring is accomplished by the shape in cross section of the end wall 30. If the end wall is formed to increase axial width of the oil ring in any portion of the radius, it will take longer to fill the cylinder to such a radial position, and the time of filling to a given radius will be increased as it takes longer to obtain an increase in radial area of the oil ring acting on the piston by in-flow of oil as it is of greater volume. Therefore, by the design of the shape of the end wall 30, a variation of actuating piston force with time will result. Consequently, the actuating force will be controlled to a desired programmed time variation by such change in axial width of the oil ring relative to its radial thickness. It is also possible to make variation in the wall of the engagement piston to make desired volume with the wall 30 for desired filling time variations.

Again referring to FIG. 1 and the diagram of FIG. 2, it has been generally indicated that centrifugal force generated oil pressure acts in a rotating oil ring on the engagement piston 28 to compact the disc clutch assembly 22 during the time that oil is fed into the cylinder from the central portion of the assembly as shown in FIG. 3 in a generally constant rate of flow. Inasmuch as the cylinder 16 is rotating, the oil thus fed into the cylinder forms an oil ring at the outermost portion of the cylinder; and for the beginning of operation, this is from 0 to 1 on the drawing FIG. 1 and the graph FIG. 2. If the end wall 30 of the cylinder were formed so that the cylinder is closed by a flat circular cover closing the end of the cylinder, there would be a continuous build up of an oil ring of constant width axially of the cylinder. This would produce a variation in force but not necessarily a desired variation.

It is a characteristic of this arrangement that the build up of the radial area of the oil ring is made variable with time, that is, the radial area of the oil ring produces a centrifugal force generated pressure which is constant for each radius for a given rate of rotation of the driving shaft. Therefore, if a different time pattern of force variation is desired such as that in FIG. 2, it will be necessary to change the time rate of increase in the thickness of the annular ring so that a given generated pressure occurs at the desired radius and time to satify the requirements of a force and torque curve such as FIG. 2, and this is accomplished by forming the end wall 30 so that the desired pressure occurs at the required time period by providing a shape of the wall 30 to determine a volume such that the filling time required to bring the oil ring to the desired area and pressure occurs at the required filling time to reach that pressure. Therefore, it is possible to determine, by computation, a shape pf the end wall, such as the shape 30 in FIG. 1, so that the desired force occurs at the desired time interval to obtain a desired curve of actuating force variation with time, such as FIG. 2. In case of a helicopter clutch the computation will take regard in essence to a constant torque component for the constant acceleration of masses and to a superimposed parabolic component to overcome the aerodynamic drag of the helicopter rotor.

It has been indicated by the above description that the oil ring increases in radial thickness with an inflow of oil during rotation, and there have been indicated on FIG. 1 lines representing increments of increased amounts of oil; and therefore increases in radial thickness of the oil ring. These have been shown in 0, 1, 2, 3, and 4 positions. If the effect of centrifugal force at any given rate of rotation is considered at any one of these positions, the force exerted on the piston 28 would be the centrifugal pressure generated in the oil for any position of filling and rate of rotation which would be the integrated centrifugal force generated pressure over that range of the radius which has been filled and would be exerted on the piston in the amount of pressure times the annular or so-called radial area element of the filled ring portion. Like computations could be made for positions 2, 3, and 4 thus covering conditions over the entire radius with filling completed through position 4. Actual computations would also determine a shape of end wall to produce desired conditions such as curve FIG. 2 of time rate of change in actuating pressure on the clutch.

It is, therefore, indicated that although for any given radius and rate of rotation, the centrifugal force generated pressure will be the same, but with the increase in width of the oil ring these total pressures, which increase in total amount, as the chamber fills with oil, do occur at programmed time intervals because of the increase in width. In other words, they occur during filling at a different time controlled by the shape of the end wall so that it may take longer to fill with oil from 2 to 3 than it does to fill from 1 to 2 if the shape of the end wall provides more space and, therefore, more time to fill. This is the means to accomplish the time rate variation which is the means of accomplishing a programmed actuation for a certain period of time. In other words, it will be as shown on the diagram in FIG. 2 over a twenty second period of time that there will be an initial fast build up at A which represents the start and the torque to overcome the inertia of masses, and there will subsequently be a different and slower build up represented by further spaces of time and the shape of end wall 30 can be formed to accomplish desired acceleration for a desired programmed variation during a start up slipping time for the clutch as above stated in discussing computation for end wall shape and curve FIG. 2.

It has been stated that filling of the cylinder is accomplished by inflow of oil from the central portion of the assembly which is shown more in detail in FIG. 3. The oil supply is furnished through the IN-OUT generally indicated at 32 with the lever 34; and when this lever is turned to the IN position, oil is made available centrally of the clutch through the valve member 36. It is here assumed that the driving shaft 10 with its gear 12 drives the gear 14 which rotates the cylinder assembly 16 (see FIG. 1), and this actuation starts the flow of oil which is initially in the central portion 38 under the pressure of the engine oil system after a split for libricating the sliding discs, which is not described herein in detail, through passages 40 into the passages 44 which lead to the cylinder chamber 16. The passages 40, 44 are of such size as to restrict the oil flow at the speed of rotation imposed through gears 13, 14 rotating the clutch assembly so that a uniform flow of oil from the central portion outward, over the selected interval, here twenty seconds, is available during slipping time.

During a given fluid feeding time interval of clutch actuation there will result a programmed variation in actuating force with time on the clutch of an amount in proportion to the variation in centrifugal force generated oil pressure times the radial thickness area of said oil ring. This product is influenced by means of variation of the increment of the radial area with the time and not of an increment of pressure which has its pregiven parabolic dependence over the radius for a given rate of rotation of the driving member.

The oil build up of the oil ring in the chamber 16 occurs in the manner previously discussed, the initial build up such as 17 representing generally the region 0 – 1 is the initial build up of oil and the oil ring forms radially with the filling of the cylinder into radial thicknesses represented by 1 – 2, 2 – 3, and 3 – 4. This has been previously mentioned as corresponding to various positions on the curve A. B, shown in FIG. 2, and which has been set forth on the diagrammatic showing on FIG. 1 and represents a twenty second time interval which is the assumed time interval for actuation of the clutch in this illustrative disclosure. It is particularly to be noted that after the initial start of the actuation time period, the cycle of actuation continues without further outside control other than the rotation of the clutch unit and the rotation of the cylinder 16 from the driving shaft which causes the centrifugal force acting on the oil to feed the oil through the passages in the assembly until it finally is fed in a generally uniform flow rate during the twenty second period of actuation through the inlet channels 44 which lead to the hydraulic cylinder 16 which has the end wall 30 and is a chamber which is formed on its opposite side by the clutch engagement piston 28. Thus, there is a manual control of the clutch by the IN-OUT lever 34 which starts the cycle of actuation, it being assumed, of course, that the engine is in operation and rotating the drive shaft and the gear 14. The clutching actuation is, therefore, started by the lever 34 and continues without other manual control, but follows the build up of the oil ring which is the means of time interval control of the clutch actuation as has previously been set forth earlier in this description.

It is to be understood that the term "cylinder" which is applied to the member 16 in FIG. 1 as well as in FIG. 3 defines a structure which is an annular member with a cylindrical outer wall, and the term cylinder as used herein is understood to include such a structure.

The mechanism has been described and has reference to a specific structure, but it is intended that variations may be expected within the terms of the following claims.

I claim:

1. In a hydraulic fluid actuated clutch for frictionally coupling a driving shaft to a driven shaft, said clutch being supported in a rotatable annular housing having an end wall, a piston positioned in said housing between said end wall and said clutch and being mechanically coupled to said clutch for actuating it, the space between said piston and said end wall providing a chamber for hydraulic fluid, the improvement in the actuation of said clutch providing the application of piston force to said clutch at a preprogrammed rate, said improvement comprising:

means for supplying hydraulic fluid to said chamber at a predetermined constant flow rate;
   means for rotating said annular housing whereby fluid in said chamber is formed into a ring by the centrifugal forces resulting from the rotation of said chamber, the faces of said end wall and said piston forming said chamber having axial and radial dimensions defining a radially outermost first section wherein said faces extend radially, are closely adjacent and parallel so that the height of said fluid increases initially at a rapid constant rate thereby providing a rapidly increasing predetermined piston force and defining a second section radially inward from said first section wherein both of said faces diverge away from a radial plane between the face whereby the faces form an obtuse angle therebetween so that the height of said liquid increases at a substantially lower rate than said rapid rate, thereby providing a relatively low increase in piston force and said faces defining a third radially innermost section wherein said faces converge toward one another so that the height of said liquid finally increases at an increasing rate whereby the forces on said piston are applied to said clutch at said preprogrammed rate.

2. The invention as defined in claim 1 wherein said means for supplying hydraulic fluid to said chamber comprises a source of pressurized hydraulic fluid and a plurality of oil inlet ports in said housing for supplying said fluid from said source to said chamber.

* * * * *